United States Patent

Vikstrom

[11] 3,882,387
[45] May 6, 1975

[54] ELECTRICAL CURRENT DETECTOR
[75] Inventor: Dennis G. Vikstrom, Sterling Heights, Mich.
[73] Assignee: General Motors Corporation, Detroit, Mich.
[22] Filed: Mar. 23, 1973
[21] Appl. No.: 344,072

[52] U.S. Cl............................. 324/117 R; 324/127
[51] Int. Cl........................ G01r 1/22; G01r 19/00
[58] Field of Search............ 324/117 R, 117 H, 127; 336/175, 176

[56] References Cited
UNITED STATES PATENTS

| | | | |
|---|---|---|---|
| 2,608,621 | 8/1952 | Peterson | 324/43 R |
| 3,007,106 | 10/1961 | Bergh et al. | 324/117 |
| 3,454,879 | 7/1969 | Smitka | 324/117 R |
| 3,634,875 | 1/1972 | Bixby | 324/117 R |

FOREIGN PATENTS OR APPLICATIONS

| 791,782 | 10/1935 | France | 324/127 |
|---|---|---|---|

*Primary Examiner*—Gerard R. Strecker
*Assistant Examiner*—Ernest F. Karlsen
*Attorney, Agent, or Firm*—Warren D. Hill

[57] ABSTRACT

A folded annular core of uniform cross section has an excitation winding and a feedback winding on each core half. A source of unidirectional current pulses periodically energizes the excitation windings to saturate the core. A measuring circuit detects the e.m.f. values induced in each excitation winding after each current pulse terminates, subtracts one value from another and integrates the difference to provide an output signal proportional to the current being measured. A feedback circuit produces a current proportional to the output signals to energize the feedback windings for nulling the core flux due to the current being measured to insure that the device operates in the linear region of the hysteresis loop of the core. A clamp-on current detector uses two folded annular cores to completely encircle a conductor carrying the current to be measured.

2 Claims, 4 Drawing Figures 3,882,387

ELECTRICAL CURRENT DETECTOR

This invention relates to electrical current detectors and particularly to electrical current detectors of the type utilizing a ferromagnetic core responsive to the magnetic field of a current to be measured.

It is known to measure d.c. currents in a conductor by encircling the conductor with a ferromagnetic core where the core is split or hinged to allow insertion and removal of the conductor. Such devices exhibit low accuracy and repeatability because the contact points of the split core do not always close in exactly the same manner from test to test thereby causing a variation in the core reluctance. Moreover, such devices require that the core encircle the conductor and are not applicable where the conductor is embedded in a sheet of glass, for example, or is otherwise impossible to encircle. Previous current detectors generally utilized the principle of exciting the core with an a.c. signal and then detecting second harmonics which are related to the current being measured. Such measuring circuits are complex and present phase problems between the excitation and the measuring circuits. In addition, the prior circuits are subject to errors caused by residual magnetism in the core and are restricted to a limited range of measured current.

It is therefore an object of this invention to provide a current detector having a core which need not encircle the conductor to measure the current in the conductor.

Another object of the invention is to provide a pair of such cores for encircling a conductor for measuring its current whereby the cores may be separated by insertion of the conductor without changing the core reluctance.

A further object is to provide a simple measuring circuit for use with the core which is independent of the core excitation frequency and which is not effected by residual core magnetism.

Still another object is to provide a current sensor having a wide range on the order of 0 to 100 amperes of measured current.

The invention is carried out by providing a folded annular core of uniform cross section having two integrally connected core halves, each core half being provided with an excitation winding such that the core is sensitive to the magnetic field of a current being measured, even though the core does not encircle the current carrying conductor. In addition the invention is carried out by providing a measuring circuit for exciting the windings, sampling the e.m.f. generated therein by change of core flux after excitation, differentially summing the e.m.f.'s and integrating the difference to provide a signal proportional to the current being measured. The invention further contemplates feedback windings on each core and a feedback circuit for energizing the feedback windings by a current proportional to the current being measured to null that flux in the core which is due to the current being measured.

The above and other advantages will be made more apparent from the following specification taken in conjunction with the accompanying drawings wherein like reference numerals refer to like parts and wherein.

Figure 1:
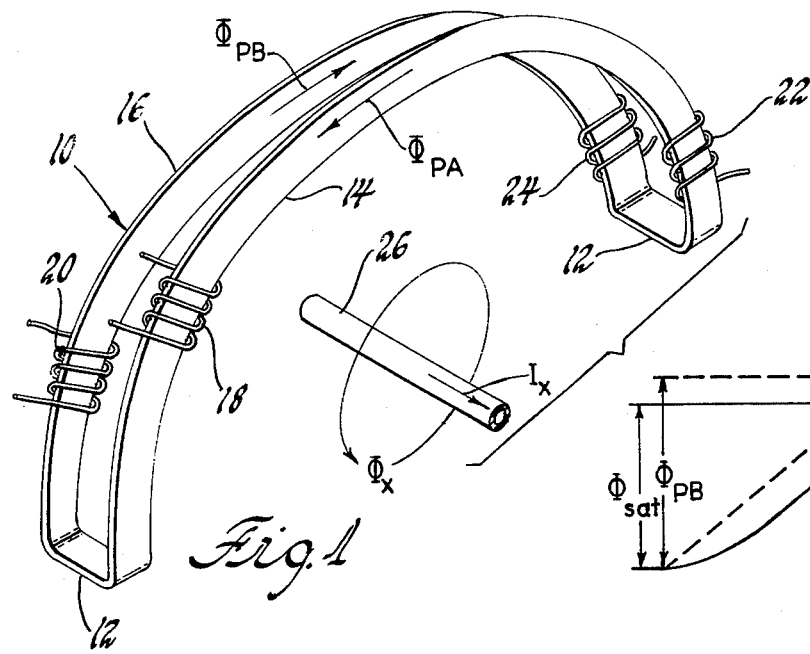
FIG. 1 is a diagrammatic illustration of a current sensor core according to the invention.

FIG. 1 illustrates a folded annular core 10 made from a thin ferromagnetic sheet metal annulus which is bent at diametrically opposed fold portions 12 to form two generally semi-circular core halves 14 and 16 lying in spaced parallel planes. Thus the core is formed as an integral unit and has uniform cross section throughout. The core material is an iron nickel alloy of low coercive force, high permeability, and medium or low saturation induction. The characteristics of the core are not critical however so long as the material is ferromagnetic and is relatively linear in the active region of its hysteresis loop. The core halves 14 and 16 are wound with excitation windings 18 and 20 respectively as well as with serially connected feedback windings 22 and 24 respectively.

In use the folded core 10 is placed in the magnetic field $\Phi_r$ of a conductor 26 carrying current $I_r$. By means of circuitry to be described below, unidirectional pulses are applied to the excitation windings 18 and 20 such that the resulting flux fields in the core are additive and of sufficient intensity to saturate all portions of the core. The saturation levels are shown in the hysteresis loop diagram FIG. 2, where $\Phi_{sat}$ represents the saturation flux for the core halves 14 and 16. At the termination of each excitation pulse, the flux in the core half 14 decreases by an amount $\Phi_{PA}$ to the flux level $\Phi_A$ which is the flux level of the core half 14 determined by the flux $\Phi_r$ due to the current to be measured $I_r$. At the same time the flux in the core half 16 changes by an amount $\Phi_{PB}$ to assume the flux level $\Phi_B$. The changing flux $\Phi_{PA}$ and $\Phi_{PB}$ in each core half induces and e.m.f. in each core winding 18 and 20 proportional to the rate of flux change. The resulting e.m.f.'s are subtracted and the difference integrated to provide an output signal proportional to the flux $\Phi_r$ and therefore proportional to the current $I_r$. This is proven by using Faraday's Law which states: $e.m.f. = -N (d\Phi/dt)$. With reference to the diagram shown in FIG. 2, it is seen that $$\int_{t_1}^{t_2} (e.m.f._{20} - e.m.f._{18}) dt = \Phi_{PB} - \Phi_{PA}$$

where an excitation pulse has ended at time $t_1$ and the measurement interval extends to time $t_2$ which is just prior to the beginning of another excitation pulse, and where $e.m.f._{20}$ is the voltage induced in coil 20 by the change of flux $\Phi_{PB}$ and $e.m.f._{18}$ is the voltage induced in coil 18 by the change in flux $\Phi_{PA}$. Further, as seen in the diagram $\Phi_{PB} = \Phi_{sat} + \Phi_B$
$\Phi_{PA} = \Phi_{sat} - \Phi_A$
$\Phi_{PB} - \Phi_{PA} = \Phi_B + \Phi_A = 2\Phi_r$ The value $2\Phi_r$ results from the fact that the two core halves 14 and 16 represent two magnetic paths. Thus it is seen that the average of the flux levels $\Phi_A$ and $\Phi_B$ equals the flux $\Phi_r$ which is proportional to the current $I_r$. It follows that the time integral of the difference of the e.m.f's is proportional to the current $I_r$.

As will be seen below, a current proportional to the current $I_r$ is supplied to the feedback windings 22, 24 to null the flux $\Phi_r$, thereby assuring that the core operate in a linear region of the hysteresis loop.

Figure 3:
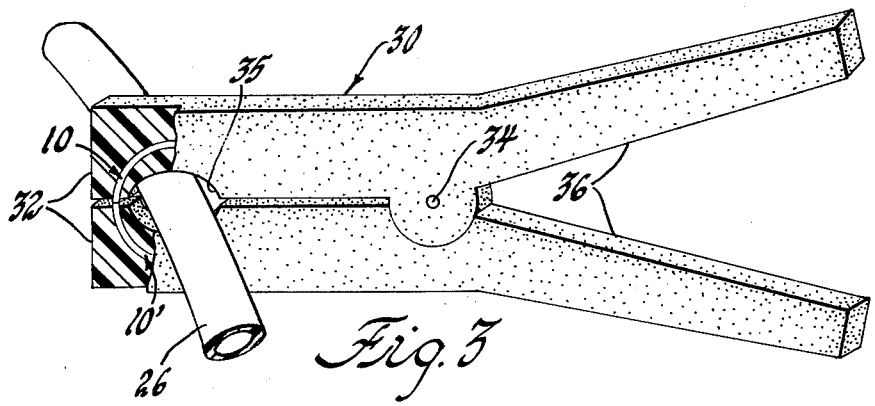
FIG. 3 is a partly broken away perspective view of a clamp-on current sensor using two current sensors of the type shown in FIG. 1.

While the single folded annular core 10 is useful for current measurements in a conductor which is so situated that it cannot be encircled by a current sensor, the efficiency of the current sensor is considerably enhanced by bridging the fold portions 12 with a magnetic path surrounding the conductor 26 to eliminate the air gap between the fold portions 12, thereby concentrating the flux $\Phi_r$ in the core. Preferably the magnetic path comprises a second folded annular core 10' completely identical to the core 10 and placed with its fold portions in contact with the fold portions 12 of core 10, as shown in the clamp-on sensor of FIG. 3.

The clamp-on current sensor 30 includes a pair of insulated jaw portions 32 which encapsulate the cores 10 and 10' except for the fold portions which are exposed to allow contact. The jaw portions 32 are pivoted at point 34 and are spring biased into engagement by means not shown to hold the cores 10 and 10' in contact. Recessed portions 35 in the jaws 32 accommodate the current conductor 26. A hand grip 36 on each jaw allows the jaws to be manually separated for removal and insertion of the conductor 26. For simplicity, the several windings on the cores and the conductors attached thereto are not illustrated.

It should be recognized that the illustrated arrangement using two folded annular cores has distinct advantages over the use of a single split core. In particular the excitation flux applied to each core is wholly contained within that core and therefore cannot be effected by a mismatch as occurs where the core halves are split. Thus the e.m.f. outputs of the excitation windings are the result of the change of flux which is fully contained within each integral core 10 or 10'. A mismatch of the two cores at their interface may change the reluctance of the path of the flux $\Phi_r$ thereby changing the value of $\Phi_r$. However the opposing flux from the feedback windings changes by an equal amount since it is subject to the same reluctance change, thereby fully compensating for any mismatch.

Figure 4:
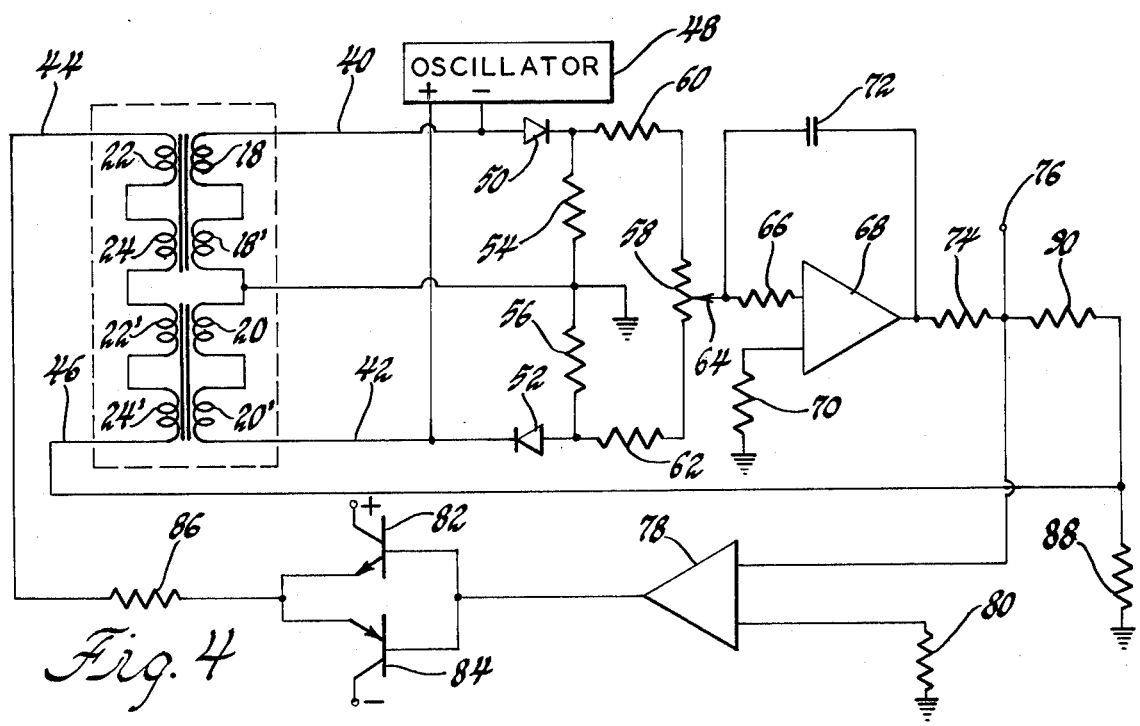
FIG. 4 is a schematic electrical diagram of a measuring circuit according to the invention for use with the core of FIG. 1.

The core windings 16 and 18 on the core 10 are serially connected with the core windings 16' and 18' on the core 10' as shown in FIG. 4 so that the output signals are doubled in value. In addition the connection of the windings of the two cores in this manner compensates for any effects of external magnetic fields. It will be seen that the core structure allows the cores to be made with a high degree of uniformity so that there is no problem in matching pairs of cores 10 and 10'.

Referring to FIG. 4, the excitation windings 18 and 18' of cores 10 and 10' are connected in series between line 40 and ground, while the excitation windings 20 and 20' are connected in series between line 42 and ground. The feedback windings 22, 24, 22' and 24' are all connected in series between lines 44 and 46. An oscillator 48 is provided for supplying excitation pulses to the excitation windings. The oscillator output is a series of square wave unidirectional pulses occurring at 100 Hz, and the on and off times of the pulses are equal in duration. A positive terminal of the oscillator 48 is connected to the line 42 while the negative terminal is connected to line 40. Diodes 50 and 52 in lines 40 and 42 are poled to isolate the periodic pulses from the oscillator 48 from all the system except the excitation windings. The diodes 50 and 52 are each connected to ground through resistors 54 and 56 respectively; they are also connected to opposite ends of a potentiometer 58 through resistors 60 and 62 respectively. The potentiometer 58 is adjustable to calibrate the circuit for zero output when the current $I_r$ is zero. The center tap 64 of the potentiometer 58 is connected through a resistor 66 to an input of an operational amplifier 68, another input of which is connected to ground through a resistor 70. A feedback circuit containing an integrating capacitor 72 is connected from the ouput of the amplifier output 68 to the center tap 64 to form an integrating circuit.

In operation of the circuit as thus far described, an excitation pulse from the oscillator is applied at time 0 and extends to time $t_1$. There is no further oscillator output until time $t_2$ when another pulse begins. The oscillator pulse passes through the excitation windings 20', 20, 18' and 18 to uniformly saturate the cores 10 and 10'. At time $t_1$ the flux in each core half decays to induce the voltages e.m.f.$_{18}$, e.m.f.$_{20}$, etc. These voltages induced in the windings 18 and 18' are combined and are of such a polarity to cause the diode 50 to conduct. Similarly the voltages induced in windings 20 and 20' are combined causing the diode 52 to conduct. The voltages passed by the diodes then are differentially summed or subtracted in the potentiometer 58 so a signal equal to the difference of the combined e.m.f.'s from the excitation windings is applied to the integrating circuit comprising the operational amplifier 68 and the capacitor 72. As explained previously, this integrated output is proportional to the current being measured. The integrator output then is fed through an output resistor 74 to an output terminal 76. A meter or other device may be connected to terminal 76 as desired for providing the desired read out of the current sensor.

A feedback circuit includes an operational amplifier 78 having one input terminal connected to the terminal 76 and the other input terminal connected to ground through a resistor 80. The output of the amplifier 78 is connected to an additional amplifier stage, in particular to the bases of two transistors 82 and 84. Transistor 82 is of NPN type and has its collector connected to a positive voltage source and its emitter connected to an output resistor 86, while the transistor 84 is a PNP type having its emitter connected to the resistor 86 and its collector connected to a negative voltage source. The two transistors 82 and 84 will conduct when their base voltages are positive and negative respectively so that the output through the resistor 86 is able to assume either polarity as required. The resistor 86 is connected to the line 44 for supplying a feedback current to feedback windings 22', 22, 24' and 24 which in turn are connected by the line 46 to ground through a resistor 88 and are connected through a feedback resistor 90 to an input of the operational amplifier 78. The feedback circuit thus provides a current through the feedback windings proportional to the output signal at terminal 76 and therefore proportional to the current being measured. The purpose of the feedback circuit is to null that flux in the cores 10 and 10' which is due to the flux $\Phi_r$ from the current being measured, thereby insuring that each core is operated in the linear region of its hysteresis loop. Although the measuring circuit has been found suitable for measuring currents up to six or seven amps without the feedback circuit, its range is increased from 0 to 100 amps with the feedback circuit.

Figure 2:
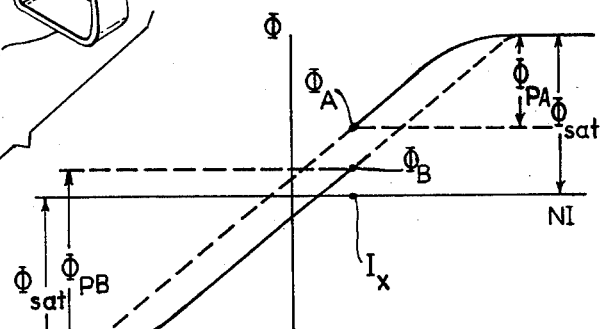
FIG. 2 is a graph illustrating the hysteresis loop and several flux values within the current sensor core of FIG. 1.

It will thus be seen that the current sensor cores according to this invention are very flexible in application in that two cores may be used together for completely encircling a conductor or if desired a single core may be used where the conductor is not accessible for encircling by a pair of cores. In addition the circuit is insensitive to the direction of the current $I_r$. Further, during the measuring portion of the cycle only the flux change occurring between core saturation and the points $\Phi_A$ and $\Phi_B$ are sensed so that only the solid line portions of hysteresis loop in FIG. 2 are germane to the operation of the device. It is therefore immaterial what return path the hysteresis loop takes to saturation during the excitation pulses. That feature along with the isolation diodes in the measuring circuit render the measurements independent of the magnitude, frequency or other qualities of the excitation pulses so that there are no phasing problems associated with the measurement and the measuring circuit can therefore be very simple.

The embodiment of the invention described herein is for purposes of illustration and the scope of the invention is intended to be limited only by the following claims:

It is claimed:

1. Means for measuring a d.c. current in a conductor comprising,
    a current sensor for placement in the magnetic field of the current including a unitary folded annular core defining two core halves, the core comprising ferromagnetic material of uniform cross section, so that the core halves carry flux proportional to the magnetic field of the current, and an excitation winding and a feedback winding on each core half,
    and a measuring circuit including,
    excitation circuit means for delivering to the excitation windings periodic pulses of unidirectional current sufficient to uniformly saturate the core, and
    a detecting circuit connected with the excitation windings and electrically isolated from the periodic pulses having means for differentially summing e.m.f. pulses generated in the excitation windings by core flux change occurring after the termination of each periodic current pulse, and having integrator means for integrating the differential sum thereby producing a signal proportional to the current in the conductor,
    and a feedback circuit associated with the detecting circuit and connected to the feedback windings for supplying current for nulling that d.c. flux in the core material which is due to the current being measured.

2. Means for measuring a d.c. current in a conductor comprising,
    a current sensor for placement in the magnetic field of the current including,
    a pair of folded annular cores, each core defining two core halves integrally connected at two fold portions, the cores comprising ferromagnetic material of uniform cross section, so that the cores carry flux proportional to the magnetic field of the current, a feedback winding on each core half, and first and second excitation windings on the core halves of one core and third and fourth excitation windings on the core halves of the other core,
    means for holding the two cores in contact at the fold portions to completely encircle the conductor and for effecting separation of the two cores to permit insertion and removal of the conductor;
    and a measuring circuit including,
    excitation circuit means for delivery to the excitation windings periodic pulses of unidirectional current sufficient to uniformly saturate the core, and
    a detecting circuit connected with the excitation winding and electrically isolated from the periodic pulses having means for combining e.m.f. pulses generated in first and third excitation windings by core flux change occurring after the termination of each periodic current pulse, means for combining the e.m.f. pulses similarly generated in the second and fourth excitation windings, means for differentially summing the two combined e.m.f. pulses, and having integrator means for integrating the differential sum thereby producing a signal proportional to the current in the conductor,
    and a feedback circuit associated with the detecting circuit and connected to the feedback windings for supplying current for nulling that d.c. flux in the core material which is due to the current being measured.

* * * * *